July 21, 1959 C. P. SMITH Re. 24,670
DEVICE FOR EXTRACTING THE EXCITATION FUNCTION FROM SPEECH SIGNALS
Original Filed June 27, 1952
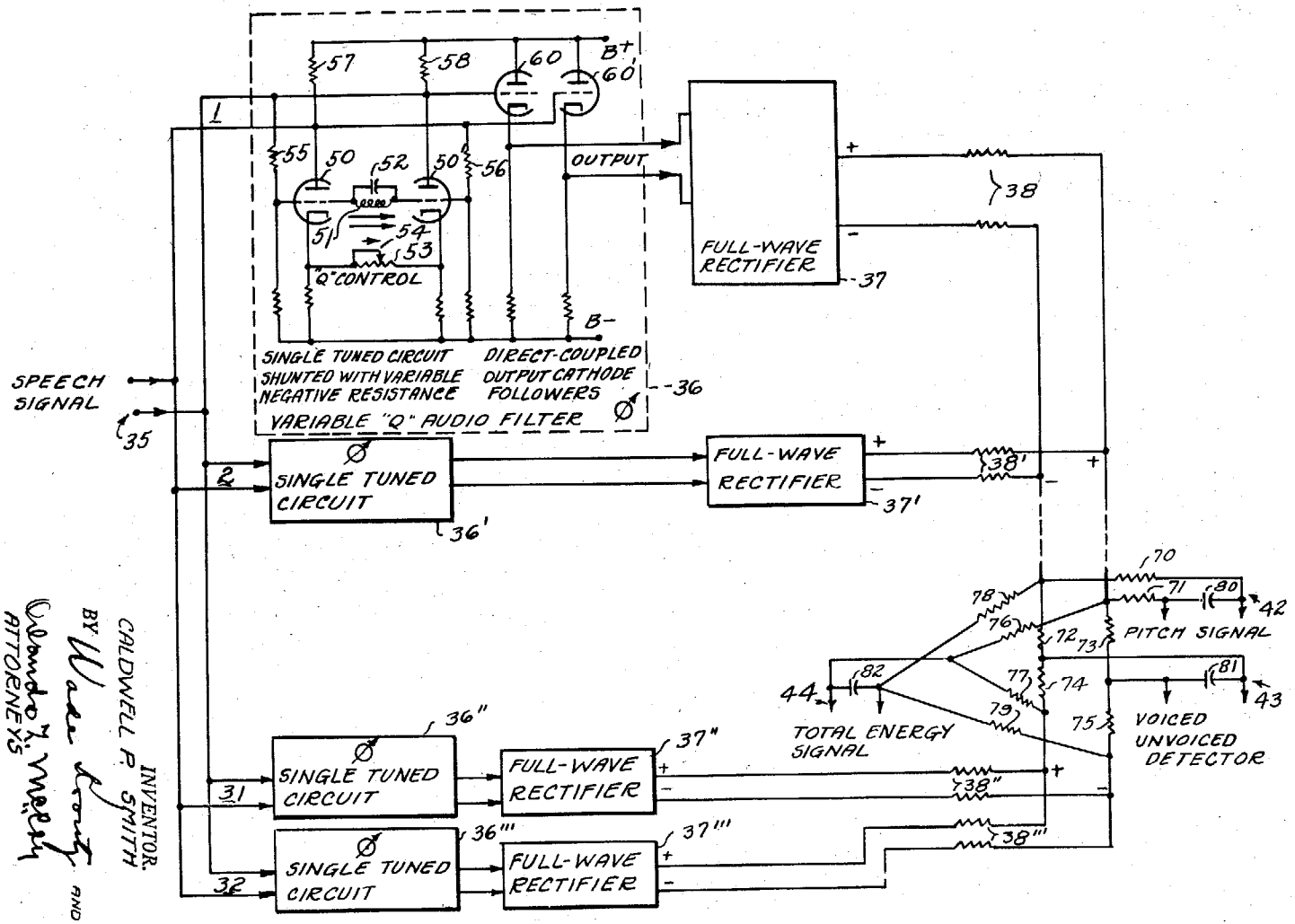
INVENTOR.
CALDWELL P. SMITH
BY Wade Crosby AND
Orlando Z. Mecky
ATTORNEYS United States Patent Office Re. 24,670
Reissued July 21, 1959

24,670

DEVICE FOR EXTRACTING THE EXCITATION FUNCTION FROM SPEECH SIGNALS

Caldwell P. Smith, Bedford, Mass., assignor to the United States of America as represented by the Secretary of the Air Force Original No. 2,691,137, dated October 5, 1954, Serial No. 296,101, June 27, 1952. Application for reissue April 23, 1956, Serial No. 580,152

11 Claims. (Cl. 179—1)

(Granted under Title 35, U.S. Code (1952), sec. 266)

Matter enclosed in heavy brackets [ ] appears in the original patent but forms no part of this reissue specification; matter printed in italics indicates the additions made by reissue.

The invention described herein may be manufactured and used by or for the Government for governmental purposes without the payment to me of any royalty thereon.

This invention relates to a device for producing electrical signals, one of which is indicative of the total amount of energy in a plurality of channels, another of which is available for distinguishing between voice and unvoiced speech sounds and a third of which is available as a pitch signal.

The device shown in the single figure of the accompanying drawing and contempated hereby comprises an input bus 35 of two conductors on which is impressed an electrical signal that may be indicative of sound, such as human speech.

The bus 35 is connected in parallel to a plurality of channels 1 to 32, inclusive, of which the channels 3 to 30 are not shown for simplicity. The components within the channels are substantially duplicates of each other and hence corresponding channel components are designated by corresponding numerals primed.

The channels are of narrow frequency bandwidths which divide the speech or other frequencies into contiguous channels. Each filter is of the tuned audio bandpass type shown in the drawing in the dashed block designated 36 as a variable Q audio filter or more simply as a single tuned circuit. The filters are arranged with a frequency separation from each other corresponding to the Koenig scale. Each filter passes its output to a balanced full-wave rectifier 37.

Electrical signals suitable for distinguishing between voiced and unvoiced sounds are accomplished by the division of the network into two sections, one embracing low frequency balanced outputs and the other embracing high frequency balanced outputs from the rectifiers 37, 37′ etc. The division between these two sections is at approximately 3,000 cycles per second for male voices. The frequency division is so connected that three pairs of outputs numbered 42, 43 and 44 are obtained therebetween from a plurality of interconnected resistances. This plurality of interconnected resistances is connected with two pairs of input terminals, one from the low frequency filters and one from the high frequency filters and has three pairs of output terminals 42, 43 and 44.

The first output 44 from the plurality of interconnected resistances is in accordance with the summation of all the positive and negative voltages as a measure of the total energy in the speech signal. The second output 42 is in accordance with the difference between the positive and negative voltages from the low frequency filter network, which is indicative of a pitch signal and uninfluenced by the positive and negative voltages from the high frequency channels. The third output 43 is equal to the algebraic difference of the high frequency and low frequency outputs going to a detector not shown, and designated on the drawing as voiced unvoiced detector. The plurality of interconnected resistors between the low frequency and high frequency filter groups are mixed at contacts 43 to produce a difference voltage.

The channel frequencies of 1,000 cycles per second and below are increased by hundreds. Above 1,000 cycles per second the frequencies increase in a logarithmic relation. Voiced sounds provide exponential pulses that are periodic at the frequency of the fundamental pitch. Unvoiced sounds are shown by wave traces having ragged edges. The detector to be connected with the terminal 43 is commonly available and hence is not shown.

The heart of the invention resides in the combination of the filters 36, the full-wave rectifiers 37 and the matrix or bridge system of the plurality of interconnected resistors 70 to 79, inclusive and the capacitors 80, 81 and 82, between the members of the contact pairs 42, 43 and 44 whereby the low and high frequeny inputs yield the three respective outputs at the terminals 42, 43 and 44.

The full-wave rectifier 37 gives a balanced D.C. output from an A.C. input. The plurality of interconnected resistances designated in the drawings 70 to 79, inclusive, is a highly complex device with an apparent mode of operation.

Illustrative filter frequencies and bandwidths for the channels are shown below:

FILTER FREQUENCIES AND BANDWIDTHS

| | $f_0$ (cycles/sec.) | $\Delta f$ (cycles/sec.) |
|---|---|---|
| 1 | 97 | 50 |
| 2 | 158 | 75 |
| 3 | 245 | 100 |
| 4 | 347 | 100 |
| 5 | 448 | 100 |
| 6 | 548 | 100 |
| 7 | 649 | 100 |
| 8 | 749 | 100 |
| 9 | 849 | 100 |
| 10 | 949 | 100 |
| 11 | 1,040 | 108 |
| 12 | 1,165 | 117 |
| 13 | 1,287 | 127 |
| 14 | 1,420 | 138 |
| 15 | 1,564 | 150 |
| 16 | 1,720 | 162 |
| 17 | 1,888 | 176 |
| 18 | 2,070 | 190 |
| 19 | 2,270 | 206 |
| 20 | 2,481 | 223 |
| 21 | 2,715 | 243 |
| 22 | 2,968 | 263 |
| 23 | 3,244 | 285 |
| 24 | 3,540 | 309 |
| 25 | 3,863 | 340 |
| 26 | 4,212 | 362 |
| 27 | 4,591 | 394 |
| 28 | 5,000 | 427 |
| 29 | 5,445 | 463 |
| 30 | 5,930 | 500 |
| 31 | 6,430 | 500 |
| 32 | 6,930 | 500 |

In the above chart, channels 1 through 20 cover the low frequency field up to approximately 2481 cycles per second. Signals above this frequency are handled by the remaining channels in the device.

Each single tuned circuit 36 comprises tuned circuit tube sections 50 and 50′ with an inductor 51 shunted by a variable capacitor 52 between the grids of the tube sections. The cathodes of the tube sections 50 and 50′ are shunted by an adjustable Q control potentiometer resistor 53, to which a variable tap 54 is adjustably applied. A two section cathode follower tube has one section 60 connected directly with one of the input leads from the bus 35 that also is connected through a resistor 55 with the grid of the tuned circuit first tube section 50 and through a resistor 58 with a B+ current source. The grid of the second section 60′ of the cathode follower tube is connected directly to the other lead from the bus 35 that is connected directly to the plate of the tuned circuit tube section 50 and through resistor 57 with the B+ power supply. The B+ power supply is applied directly to the plates of the cathode follower tube sections 60 and 60' and through resistors 57 and 58 with the plates of the tuned circuit tube sections 50 and 50' respectively. The grid of the second section 50' of the tuned circuit tube is connected through a resistor 56 with the second lead from the bus 35 and with the grid of the cathode follower tube section 60'. Output from the single tuned circuit 36 is from the two cathodes of the cathode follower tube section 60 and 60' to the full-wave rectifier 37.

In the measurement of the excitation function, the plurality of interconnected resistances in the matrix containing the contacts 42, 43 and 44 are connected directly to the rectified output from the filters to provide a measure of the energy envelope as it fluctuates in time, averaged over one three hundredths of a second by means of the resistance-capacitance smoothing circuit shown. The signal generated by this summation provides a representation of the excitation emitted from the vocal cords. The exponential wave rises steeply and decays gradually in synchronization with the opening and the closing of the vocal flaps during phonation.

In order to differentiate between voiced and unvoiced sounds, at the contacts 43 the summation network is divided into two sections, one of which sums the energy envelopes from all the low frequency filters and the other sums the high frequency filters. As the formants generally lie below 3,000 cycles per second the cross-over point has been set at this frequency. The two summation signals are mixed to produce a detection signal proportional to the difference between high and low frequency energy. In the resulting voltage wave form the sibilants produce upward deflection having ragged edges and the voiced sounds produce exponential pulses deflecting downward and periodic at the frequency of the fundamental pitch.

The low frequency summation signal provides a means of measuring the fundamental pitch of voiced sounds which is independent of the presence or absence of low-frequency components in the original speech signal. This is in contrast with conventional techniques which use a low-pass filter to separate the fundamental pitch.

The pitched signal may be used as excitation for variable resonators in order to generate synthetic formants which can be added to the original speech in synchronism with the original excitation. This becomes more effective if the pitched signal is first passed through a nonlinear device in order to replace the high frequency harmonic structure extending up to 3,000 cycles-per-second which was contained in the original excitation pulses from the vocal cords and progressive attenuation in the vocal resonators, the analyzing filters and the smooth circuits.

The sum of the low- and high-frequency summation signals smoothed in a resistance-capacitance filter provides a running average of the total speech energy weighted by pre-emphasis of the high frequencies before analysis. This signal is used to control an automatic-gain-control amplifier ahead of the speech analyzer in order to provide an automatic normalization of the speech energy level.

What I claim is:

1. A circuit for producing a plurality of electrical signals comprising a plurality of channels of contiguous frequency bands, and each channel containing a single tuned circuit, a balanced full-wave rectifier rectifying the output from said tuned circuit and having a positive and negative balanced output, a pair of smoothing resistors in the balanced output of each of said rectifiers and the plurality of said channels divided into two positive and negative outputs from low frequency channels and two outputs from high frequency channels, and a plurality of interconnected resistances between the balanced outputs from the pair of end resistors in the low frequency channels and from the end resistors in the high frequency channels leading to a pair of total energy signal terminals with a capacitor therebetween and a negative terminal resistively connected to the negative output from the low frequency channels and resistively connected to the negative output from the high frequency channels and a positive terminal resistively connected to the positive output from the low frequency channels and resistively connected to the positive output from the high frequency channels.

2. A circuit for producing a plurality of electrical signals, comprising a plurality of channels of contiguous frequency bands, and each channel containing a single tuned circuit, a balanced full-wave rectifier rectifying the output from said tuned circuit, and each channel terminating in a pair of resistors receiving their inputs from said balanced rectifier, said plurality of channels divided into low frequency channels and high frequency channels each having an output at a pair of channel leads of opposite polarity, and a plurality of interconnected resistances deriving their input from the pairs of channel leads and leading to a pair of pitch signal terminals with a capacitor therebetween and with a negative terminal resistively connected to the low frequency negative channel lead and with a positive terminal resistively connected to the low frequency positive channel lead.

3. A circuit for producing a plurality of electrical signals, comprising a plurality of channels of contiguous frequency bands, and each channel containing a single tuned circuit, a balanced full-wave rectifier rectifying the output from said tuned circuit, and a pair of resistors at the output end of each channel, said plurality of channels divided into low frequency channels increasing by 100 cycles per second between channels up to 1,000 cycles per second and said high frequency channels increasing between channels in a logarithmic relation above 1000 cycles per second, a pair of low frequency channel terminal leads of opposite polarity, a pair of high frequency channel terminal leads of opposite polarity, and a plurality of interconnected resistances deriving their input from the two pairs of channel leads and providing three pairs of output circuit terminals inclusive of a pair of voiced unvoiced detector terminals capacitively coupled together and with each separate detector terminal resistively connected to the low frequency channel lead of one polarity and to the high frequency channel lead of opposite polarity.

4. A circuit for producing a plurality of electrical signals comprising a plurality of tuned circuits each having a center frequency differing from the center frequency of each of the other circuits and having a predetermined bandwidth, said tuned circuits having a common input to which a complex electrical signal representative of sounds may be applied, those circuits having a center frequency at or immediately adjacent to the pitch of the sound comprising a low frequency group and said tuned circuits having center frequencies higher than those circuits comprising the low frequency group making up a higher frequency group, means to produce a balanced D.C. signal proportional to the sum of the outputs of those tuned circuits comprising the low frequency group, means to produce a balanced D.C. signal proportional to the sum of the outputs of those tuned circuits making up the high frequency group, a plurality of resistance defining a circuit having two pairs of inputs and three pairs of outputs and so interconnected that when the balanced D.C. signal proportional to the sum of the outputs of the low frequency group of tuned circuits is applied to one of said pair of input terminals and the balanced D.C. signal proportional to the sum of the outputs making up the high frequency group is applied to the other pair of input terminals, the first pair of output terminals that are capacitively coupled together and each of which first output terminals is resistively connected to both the low frequency and high frequency D.C. signal of the same polarity such that the first pair of output terminals will produce a total energy signal which is the sum of the two input signals, the second pair of output terminals that are capacitively coupled together and each of which second output terminals is resistively connected to an output from the low frequency group of tuned circuits such that the second pair of output terminals will produce a signal proportional only to the input signal representative of the output of the low frequency group and the third pair of output terminals that are capacitively coupled together and each of which third output terminals is resistively connected to an output terminal of one polarity from the low frequency group of tuned circuits and to an output terminal of opposite polarity from the high frequency group of tuned circuits such that the third pair of output terminals will produce a signal proportional to the difference between the first input signal and the second input signal.

*5. In speech analysis, an input for speech waves, a multiplicity of channels of contiguous frequency bands for subdividing said speech waves into frequency subbands, a rectifying circuit rectifying the output from each frequency band channel, a means for adding said rectified signals from frequency bands in which vowel formants occur, thereby deriving a new signal indicative of voice pitch.*

*6. In speech analysis, an input for speech waves, a multiplicity of contiguous frequency bands for subdividing said speech waves into frequency subbands, a rectifying circuit rectifying the output from each frequency band channel, a means for summing said rectified signals from low-frequency bands in which principal vowel energy occurs, a means for summing said rectified signals from high-frequency bands in which principal consonant energy occurs, a means for subtracting said sum signals, thereby deriving a signal indicative of presence or absence of voicing of the speech signal.*

*7. In speech analysis, an input for speech waves, a multiplicity of contiguous frequency band channels for subdividing said speech waves into frequency subbands, a rectifying circuit rectifying the output from each frequency band, a means for summing said rectified signals, thereby deriving a D.C. signal proportional to total speech signal energy.*

*8. In speech analysis, an input for speech waves, a multiplicity of channels of contiguous frequency bands for subdividing said speech waves into frequency subbands, a rectifying circuit rectifying the output from each frequency band channel, a means for adding said rectified signals from a group of lower frequency bands in which vowel formants occur, means for adding said rectified signals from a group of higher frequency bands, and means for obtaining the algebraic difference between the lower and the higher frequency bands indicative of voiced-unvoiced speech energy thereby deriving a new signal indicative of voice pitch.*

*9. In speech analysis, an input for speech waves, a multiplicity of contiguous frequency band channels for subdividing said speech waves into higher and lower groups of frequency subbands, a rectifying circuit rectifying the output from each frequency subband, a means for summing said rectified signals from a first lower frequency group of subbands as vowel sound energy, a second means for summing said rectified signals from a second higher frequency group of subbands as consonant sound energy, and a third means for summing rectified signals from all of the subbands and thereby deriving a direct current signal proportional to total speech signal energy.*

*10. In speech analysis circuitry, an input for speech waves, a plurality of channels subdividing the speech waves into subbands of distinctive frequency limits, rectifying means rectifying the output from each subband, and a plurality of resistor filter means separately presenting from the rectified subband outputs a pitch signal and a voiced-unvoiced signal and a total energy signal as separate distinctive output signals of the subbands.*

*11. A speech analysis circuit, comprising a speech signal input means, a plurality of single tuned circuit initiated channels of progressively differentiated frequency bands in the different channels, a single tuned circuit multivibrator at the input end of each channel comprising a pair of first triode vacuum tubes having first and second input grid electrodes separately connected to the speech signal input means and connected together through a capacitor shunted inductor and a pair of cathode electrodes connected together through a potentiometer resistor adjustably contacted by a tap connected to an end thereof and having a pair of first tube plate electrodes separately connected to the speech signal input means in reverse order from the grid connections with the speech signal input means, a pair of cathode follower second triode vacuum tubes each having a control grid electrode connected to one plate electrode of the first tube and each having a cathode electrode providing an output for the single tuned circuit, a full wave rectifier connecting in series with the signal tuned circuit in each channel, and a plurality of sound analyzing interconnected resistors summing sounds from the channel outputs as distinctive pitch signal, voiced-unvoiced detector signal and as a total energy signal.*

References Cited in the file of this patent or the original patent

UNITED STATES PATENTS

| | | |
|---|---|---|
| 2,098,956 | Dudley | Nov. 16, 1937 |
| 2,512,889 | Dreyfus | June 27, 1950 |
| 2,522,539 | Riesz | Sept. 19, 1950 |
| 2,575,909 | Davis et al. | Nov. 20, 1951 |
| 2,575,910 | Mathes | Nov. 20, 1951 |
| 2,646,465 | Davis | July 21, 1953 |